(12) United States Patent
Dessert et al.

(10) Patent No.: US 9,599,493 B2
(45) Date of Patent: Mar. 21, 2017

(54) SPLIT FLOW VORTEX FLOWMETER

(71) Applicant: Invensys Systems, Inc., Foxboro, MA (US)

(72) Inventors: Wayne A. Dessert, Rehoboth, MA (US); Wade M. Mattar, Wrentham, MA (US)

(73) Assignee: Invensys Systems, Inc., Foxboro, MA (US)

( * ) Notice: Subject to any disclaimer, the term of this patent is extended or adjusted under 35 U.S.C. 154(b) by 181 days.

(21) Appl. No.: 14/530,406

(22) Filed: Oct. 31, 2014

(65) Prior Publication Data
US 2016/0123781 A1    May 5, 2016

(51) Int. Cl.
*G01F 1/32* (2006.01)
*G01F 7/00* (2006.01)

(52) U.S. Cl.
CPC .......... *G01F 1/3218* (2013.01); *G01F 1/3209* (2013.01); *G01F 7/00* (2013.01); *G01F 1/329* (2013.01); *G01F 1/3245* (2013.01); *G01F 1/3263* (2013.01)

(58) Field of Classification Search
CPC ........................................................ G01F 1/32
USPC .................................................... 73/861.22
See application file for complete search history.

(56) References Cited

U.S. PATENT DOCUMENTS

| | | | | |
|---|---|---|---|---|
| 3,116,639 A | * | 1/1964 | Bird | G01F 1/3209 73/861.24 |
| 3,589,185 A | * | 6/1971 | Burgess | G01F 1/3218 73/861.22 |
| 3,604,263 A | * | 9/1971 | Auphan | A61B 5/028 600/505 |
| 3,693,438 A | * | 9/1972 | Yamasaki | G01F 1/3245 73/861.22 |
| 3,722,273 A | * | 3/1973 | Yamasaki | G01F 1/3272 73/861.22 |
| 3,732,731 A | * | 5/1973 | Fussell, Jr. | G01F 1/3245 73/861.22 |
| 3,733,897 A | * | 5/1973 | Herzl | G01F 1/3236 374/178 |
| 3,756,078 A | * | 9/1973 | Yamasaki | G01F 1/3245 73/861.23 |

(Continued)

OTHER PUBLICATIONS

Purna, Milinda T., 'Design and Analysis of Various Bluff Objects for Vortex Flow Meters', International Journal of Emerging Technology and Advanced Engineering, vol. 6, Issue 5, May 2016.*

(Continued)

*Primary Examiner* — Clayton E LaBalle
*Assistant Examiner* — Kevin Butler
(74) *Attorney, Agent, or Firm* — Stephen Manetta; Ralph Graham

(57) ABSTRACT

A vortex flowmeter has first and second process connections with a meter inlet and outlet, respectively, therein. The first and second process connections are configured to connect, respectively, to upstream and downstream segments of a fluid pipeline. A fluid conveyance system conveys fluid from the inlet to the outlet and divides the fluid into separate fluid streams that flow through separate passages. Each of the passages has its own vortex metering unit configured to generate and detect vortices in the respective fluid stream. A processing system is configured to calculate a sum of the flow rates through all of the fluid streams.

25 Claims, 14 Drawing Sheets

(56) References Cited

U.S. PATENT DOCUMENTS

| | | | | |
|---|---|---|---|---|
| 3,777,563 A * | 12/1973 | Yamasaki | G01F 1/3209 | 73/861.22 |
| 3,796,095 A * | 3/1974 | Fussell, Jr. | G01F 1/3254 | 73/861.24 |
| 3,796,096 A * | 3/1974 | Sielaff | A61B 5/0873 | 73/861.24 |
| 3,823,610 A * | 7/1974 | Fussell, Jr. | G01F 1/3263 | 73/861.24 |
| 3,864,972 A * | 2/1975 | Burgess | G01F 1/3236 | 73/861.22 |
| 3,874,234 A * | 4/1975 | Burgess | G01F 1/3209 | 73/861.22 |
| 3,940,986 A * | 3/1976 | Yamasaki | G01F 1/3281 | 73/861.23 |
| 3,946,608 A * | 3/1976 | Herzl | G01F 1/3263 | 73/861.24 |
| 3,948,097 A * | 4/1976 | Kurita | G01P 5/01 | 73/861.22 |
| 3,972,232 A * | 8/1976 | Miller | G01F 1/3218 | 73/861.24 |
| 4,015,472 A * | 4/1977 | Herzl | G08C 19/02 | 73/861.22 |
| 4,030,355 A * | 6/1977 | Herzl | G01F 1/3218 | 73/861.24 |
| 4,052,895 A * | 10/1977 | Herzl | G01F 1/3263 | 73/861.24 |
| 4,171,643 A * | 10/1979 | Frick | G01F 1/3263 | 73/861.24 |
| 4,173,143 A * | 11/1979 | Venton-Walters | G01P 5/01 | 73/861.22 |
| 4,186,599 A * | 2/1980 | Frick | G01F 1/3263 | 73/861.28 |
| 4,197,739 A * | 4/1980 | Frick | G01F 1/3263 | 73/861.21 |
| 4,201,084 A * | 5/1980 | Ito | G01F 1/3263 | 73/861.22 |
| 4,281,553 A * | 8/1981 | Datta-Barua | G01F 1/329 | 73/861.24 |
| 4,297,898 A * | 11/1981 | Herzl | G01P 5/01 | 73/861.22 |
| 4,307,619 A * | 12/1981 | Herzl | G01F 1/3263 | 73/861.24 |
| 4,339,957 A * | 7/1982 | Herzl | G01F 1/3263 | 73/861.24 |
| 4,350,047 A * | 9/1982 | Dewey, Jr. | G01F 1/3218 | 73/861.22 |
| RE31,217 E | 4/1983 | Rodely | G01F 1/3218 | 73/861.22 |
| 4,397,192 A * | 8/1983 | Mollet | G01F 1/3209 | 73/861.22 |
| 4,437,349 A * | 3/1984 | Joy | G01F 1/3209 | 73/861.22 |
| 4,453,416 A * | 6/1984 | Knudsen | G01F 1/3263 | 73/861.22 |
| 4,455,877 A * | 6/1984 | Blechinger | G01F 1/3209 | 73/861.22 |
| 4,464,939 A * | 8/1984 | Corpron | G01F 1/3218 | 73/861.24 |
| 4,552,026 A * | 11/1985 | Knudsen | G01F 1/3245 | 250/227.16 |
| 4,760,744 A * | 8/1988 | Simonsen | G01F 1/8409 | 73/861.357 |
| 4,770,035 A * | 9/1988 | Kolkebeck | G01F 1/3245 | 73/195 |
| 4,811,606 A * | 3/1989 | Hasegawa | G01F 1/8413 | 73/861.357 |
| 4,831,883 A * | 5/1989 | Kamenster | G01F 1/3218 | 73/861.22 |
| 4,831,885 A * | 5/1989 | Dahlin | G01F 1/8409 | 138/30 |
| 4,941,361 A * | 7/1990 | Lew | G01F 1/10 | 73/195 |
| 4,984,470 A * | 1/1991 | Hayward | G01F 1/3218 | 73/861.22 |
| 5,020,373 A * | 6/1991 | Kamiunten | G01F 1/3209 | 73/195 |
| 5,029,465 A * | 7/1991 | Tanimura | G01F 15/00 | 73/114.35 |
| 5,052,229 A * | 10/1991 | Tanimura | F02D 41/185 | 73/861.22 |
| 5,076,105 A * | 12/1991 | Lew | G01F 1/86 | 73/861.24 |
| 5,109,703 A * | 5/1992 | Tanimura | G01F 1/3263 | 73/861.22 |
| 5,121,658 A * | 6/1992 | Lew | G01F 1/10 | 73/195 |
| 5,186,056 A * | 2/1993 | Lew | G01F 1/3263 | 73/861.24 |
| 5,247,838 A * | 9/1993 | Vander Heyden | G01F 1/3263 | 73/861.22 |
| 5,343,762 A * | 9/1994 | Beulke | G01F 1/3263 | 73/861.24 |
| 5,347,873 A * | 9/1994 | Vander Heyden | G01F 1/3245 | 73/861.22 |
| 5,372,046 A * | 12/1994 | Kleven | G01F 1/329 | 327/311 |
| 5,398,548 A * | 3/1995 | Ono | G01F 1/3209 | 73/202 |
| 5,731,527 A * | 3/1998 | Van Cleve | G01F 1/8477 | 138/172 |
| 5,789,673 A * | 8/1998 | Igarashi | G01F 5/00 | 73/114.34 |
| 5,939,628 A * | 8/1999 | Igarashi | G01F 1/684 | 73/202 |
| 6,003,383 A * | 12/1999 | Zielinska | G01F 1/3218 | 73/861.22 |
| 6,212,975 B1 * | 4/2001 | Cook | G01F 1/3254 | 702/190 |
| 6,234,015 B1 * | 5/2001 | Hamada | G01F 1/684 | 73/202.5 |
| 6,298,734 B1 * | 10/2001 | Storer | G01F 1/3218 | 73/861.22 |
| 6,561,043 B1 * | 5/2003 | Bailey | G01F 1/44 | 73/861.52 |
| 6,578,414 B2 * | 6/2003 | Kohmura | G01F 1/6842 | 73/114.34 |
| 6,615,673 B1 * | 9/2003 | Cullie | G01F 1/3218 | 73/861.21 |
| 6,637,263 B2 * | 10/2003 | Zimmermann | G01F 1/684 | 73/195 |
| 6,805,002 B2 * | 10/2004 | Yonezawa | G01F 15/18 | 73/204.22 |
| 6,910,387 B2 * | 6/2005 | Koudal | G01F 1/3209 | 73/861.22 |
| 6,928,884 B1 * | 8/2005 | Pearson | G01F 1/46 | 73/861.42 |
| 7,261,001 B2 * | 8/2007 | Heijnsdijk | G01F 1/58 | 73/861.12 |
| 7,404,416 B2 * | 7/2008 | Schultz | F15C 1/22 | 137/835 |
| 7,437,925 B2 * | 10/2008 | Ban | G01F 1/6842 | 73/202.5 |
| 7,621,188 B2 * | 11/2009 | Lincoln | G01F 1/586 | 73/861.12 |
| 7,654,134 B2 * | 2/2010 | Enomoto | G01F 1/6842 | 73/114.32 |
| 7,810,401 B2 * | 10/2010 | Brown | G01F 1/662 | 73/861.63 |
| 8,544,342 B1 * | 10/2013 | Feller | G01F 1/3218 | 73/861.24 |
| 9,032,815 B2 * | 5/2015 | Noui-Mehidi | G01F 1/3218 | 73/861.22 |
| 9,080,908 B2 * | 7/2015 | Yoder | G01F 1/76 | |
| 9,194,729 B2 * | 11/2015 | Khalifa | G01F 1/3209 | |
| 9,279,706 B2 * | 3/2016 | Khalifa | G01F 1/3209 | |
| 2004/0175240 A1 * | 9/2004 | McMillan | F15D 1/10 | 405/211 |

(56) References Cited

U.S. PATENT DOCUMENTS

| | | | | |
|---|---|---|---|---|
| 2007/0163361 A1* | 7/2007 | Lewicke | ............... | G01F 15/18 |
| | | | | 73/861.22 |
| 2008/0072686 A1* | 3/2008 | Hoecker | ............. | G01F 1/3209 |
| | | | | 73/861.22 |
| 2009/0211368 A1* | 8/2009 | Garnett | .................... | G01F 1/46 |
| | | | | 73/861.22 |
| 2014/0260666 A1* | 9/2014 | Brand | .................. | G01F 1/3218 |
| | | | | 73/861.22 |
| 2016/0123781 A1* | 5/2016 | Dessert | ............... | G01F 1/3209 |
| | | | | 73/861.22 |

OTHER PUBLICATIONS

Magnetrol, 'Thermal Dispersion Mass Flow Measurement Handbook', Magnetrol International Inc. Apr. 2012, 36 pgs.*
Grandhi et al, 'Effect of bluff body shape on Vortex Flow Meter Performance', Indian Journal of Engineering & Materials Sciences, vol. 11, Oct. 2004, pp. 378-384.*
Purna et al., 'Design and Analysis of Various Bluff Objects for Vortex Flow Meters', UETAE International Journal of Emerging Technology and Advanced Engineering, vol. 6, Issue 5, May 2016.*

* cited by examiner

SPLIT FLOW VORTEX FLOWMETER

FIELD

The present invention relates generally to vortex flowmeters and more particularly to vortex flowmeters that are suitable for use in large diameter pipelines and/or under low flow conditions.

BACKGROUND

Flowmeters measure the rate of flow of a fluid in a pipe or other pathway. The fluid may be, for example, a gas or a liquid, and may be compressible or incompressible. One type of flowmeter is a vortex flowmeter, which measures parameters including, for example, flow rate based on the principle of vortex shedding. Vortex shedding refers to a natural process in which a fluid passing a bluff body (sometimes referred to as a shedder) causes a boundary layer of slowly moving fluid to be formed along the surface of the bluff body. A low pressure area is created behind the bluff body and causes the boundary layer to roll up, which generates vortices in succession on opposite sides of the bluff body. The vortices induce pressure variations that may be sensed by a pressure sensor. The vortex-shedding pressure variations have a frequency that is related to the flow rate. Accordingly, by measuring the frequency of the pressure variations, the flow rate may be determined.

Vortex flowmeters provide vortex frequency data that can be used in conjunction with flow calibration factors to determine the velocity and volumetric flow rate of the fluid passing through the meter. With fluid density values, the mass flow rate can also be computed. These measurements, and others, can be transmitted to a control room or other receiver over a communication line, such as, for example, a standard two-wire 4-20 milliamp ("mA") transmission line.

Vortex meters encounter problems if the fluid flow rate is too low because the fluid may have insufficient velocity to result in periodic vortex formation at regular intervals. One solution to this problem is to use a constriction to increase the velocity of the fluid as it flows by the bluff body relative to the fluid upstream and downstream of the bluff body. For example, the inner surfaces of the flowtube can be tapered to reduce the diameter of the cross-sectional flow area at the position of the bluff body. This approach is explained in greater detail in commonly owned U.S. Pat. No. 7,533,579, the contents of which are hereby incorporated by reference. Although this approach can improve the ability of a vortex meter to operate in low flow conditions, it is still possible for the fluid velocity to drop too low for the meter to take accurate measurements of the fluid flow. The problem can be especially troublesome with very large vortex meters (e.g., those having diameters in the range of about 12 inches or more). For example, a relatively large amount of fluid can flow through the meter even in low velocity conditions because of the large cross-sectional flow area.

The present inventors have developed systems and methods, described in detail below, that improve the ability operate a vortex flowmeter under low flow conditions.

SUMMARY

In one aspect, the present invention is a vortex flow meter. A first process connection has a meter inlet therein. The first process connection is configured to connect the meter inlet to an end of an upstream pipe segment of a fluid pipeline. A second process connection has a meter outlet therein. The second process connection is configured to connect the meter outlet to an end of a downstream pipe segment of the fluid pipeline. A fluid conveyance system conveys fluid from the meter inlet to the meter outlet. The fluid conveyance system includes multiple separate passages configured to divide fluid received by the meter inlet into multiple separate fluid streams and convey the fluid in each stream to the meter outlet. Each of the separate passages has a bluff body positioned to generate vortices in the respective fluid stream. Each of the separate fluid passages has a sensor that is configured to detect vortices in the respective fluid stream. A processing system is configured to determine a flow rate through each of the fluid streams using information from the sensors.

In another aspect of the invention, a system for measuring fluid flow through a fluid pipeline includes first and second vortex metering units. The first vortex metering unit is configured to measure flow rate of fluid through the first vortex metering unit. The second vortex metering unit is configured to measure flow rate of fluid through the second vortex metering unit. An upstream process connection is mounted on each of the first and second vortex metering units for connecting the first and second vortex metering units to an end of an upstream segment of a fluid pipeline. A downstream process connection is mounted on each of the first and second vortex metering units for connecting the first and second vortex metering units to an end of a downstream segment of the fluid pipeline.

In another aspect of the invention, a system for measuring fluid flow rate through a fluid pipeline includes a fluidic system. The fluidic system is configured to divide flow through the pipeline into multiple passages plumbed in parallel with one another and recombine the flow through the multiple passages into a single stream. A bluff body configured to generate vortices downstream of the bluff body is positioned in each of the multiple passages. Each of the passages has a sensor configured to output a signal representative of the vortices generated in one of the multiple passages. A processing system is connected to each of the sensors and configured to receive each of said signals and calculate a totalized flow measurement representative of the flow through the fluid pipeline.

In yet another aspect of the present invention, a system for measuring fluid flow rate through a fluid pipeline has an upstream process connection and a downstream process connection. The upstream process connection is connected to a downstream end of an upstream segment of the fluid pipeline. The upstream process connection has an outer perimeter. The downstream process connection is connected to an upstream end of a downstream segment of the fluid pipeline. Multiple fluid passages are plumbed in parallel with one another. The passages are arranged so they can be fluidically connected to the upstream segment of the fluid pipeline by the upstream process connection and fluidically connected to the downstream segment of the fluid pipeline by the downstream process connection. A bluff body configured to generate vortices downstream of the bluff body is positioned in each of the multiple passages. Each of the passages has a sensor configured to output a signal representative of the vortices generated in one of the multiple passages. A processing system is connected to each of the sensors and configured to receive each of said signals and calculate a flow rate measurement representative of the flow rate through the fluid pipeline. The multiple passages are collectively confined entirely within a geometric space. The geometric space extends between the upstream and downstream process connections and has a cross-sectional area equal to the area circumscribed by the outer perimeter of the upstream process connection.

Other aspects of the present invention will be apparent in view of the following description and claims.

BRIEF DESCRIPTION OF THE DRAWINGS

Corresponding reference characters indicate corresponding parts throughout the description and claims.

DETAILED DESCRIPTION

Figure 1:
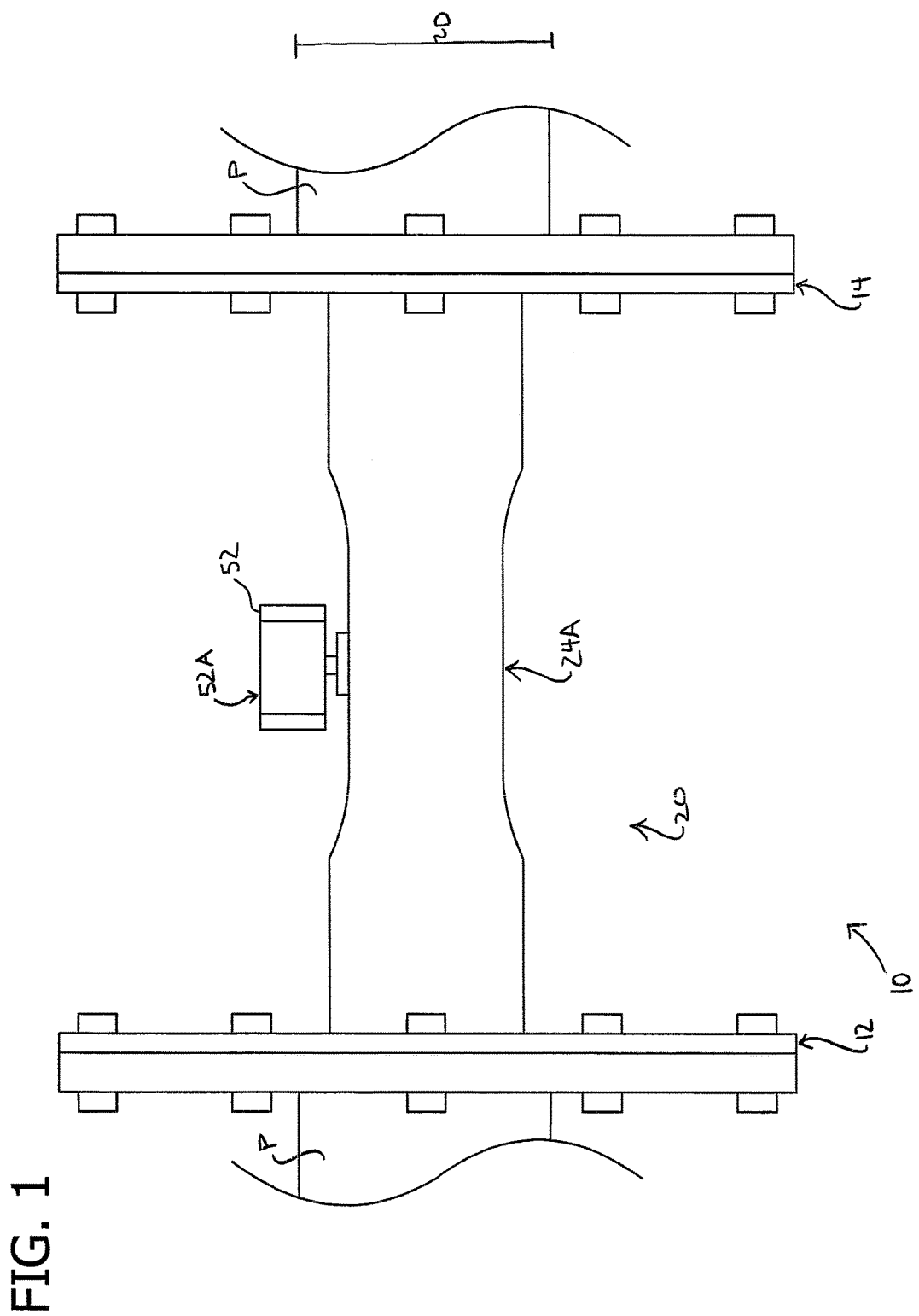
FIG. 1 is a schematic side elevation of one embodiment of a split flow vortex flowmeter.

Turning now to FIG. 1, one embodiment of a split flow vortex flowmeter is generally indicated at 10. As illustrated, the flowmeter 10 is installed in a pipeline P for measuring flow through the pipeline. The flowmeter 10 includes a first process connection, generally indicated at 12, and a second process connection generally indicated at 14. The first process connection 12 includes a meter inlet 16 (FIG. 3) therein, and the second process connection 14 includes a meter outlet 18 therein. The first process connection 12 is configured to connect the meter inlet 16 to a downstream end of an upstream pipe segment of the fluid pipeline P. The second process connection 14 is likewise configured to connect the meter outlet 18 to an upstream end of a downstream pipe segment of the fluid pipeline P. It will be understood to those skilled in the art that the process connections 12 and 14 may provide a fluidic seal between the flowmeter 10 and each respective segment of the fluid pipeline P. Suitable connections may include, for example, compressive engagement of opposed, planar flange faces, as illustrated, with or without a gasket or other sealing member. However, other connections (e.g., wafer-style process connections, etc.) can also be used without departing from the scope of the invention. Fasteners (e.g., bolts or any other suitable fasteners) can be used to secure the connection between the process connections 12, 14 and the pipeline P.

Typically, as is well understood in the art, vortex flowmeters are installed in pipelines or other conduits configured to carry a flowing fluid in a particular direction. In many implementations, when the system in which the pipeline is used is functioning properly, fluid will consistently flow in the same direction. The terms "upstream" and "downstream" should be understood to be used in reference to this expected flow direction. It is understood fluid may temporarily or intermittently flow in a reversed direction (e.g., out the inlet 16) without departing from the scope of the invention.

Figure 2:
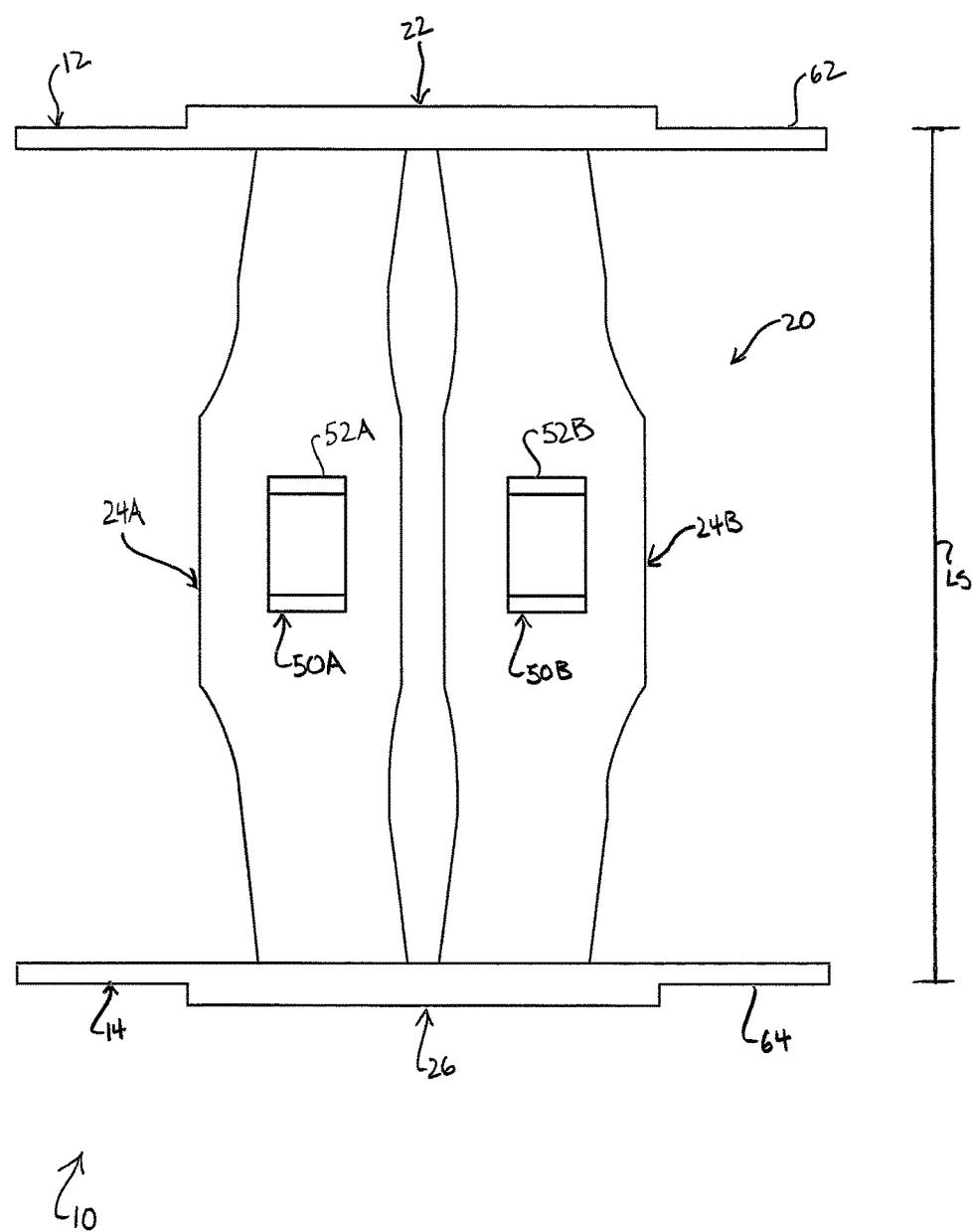
FIG. 2 is a schematic top plan the flowmeter of FIG. 1.
Figure 2A:
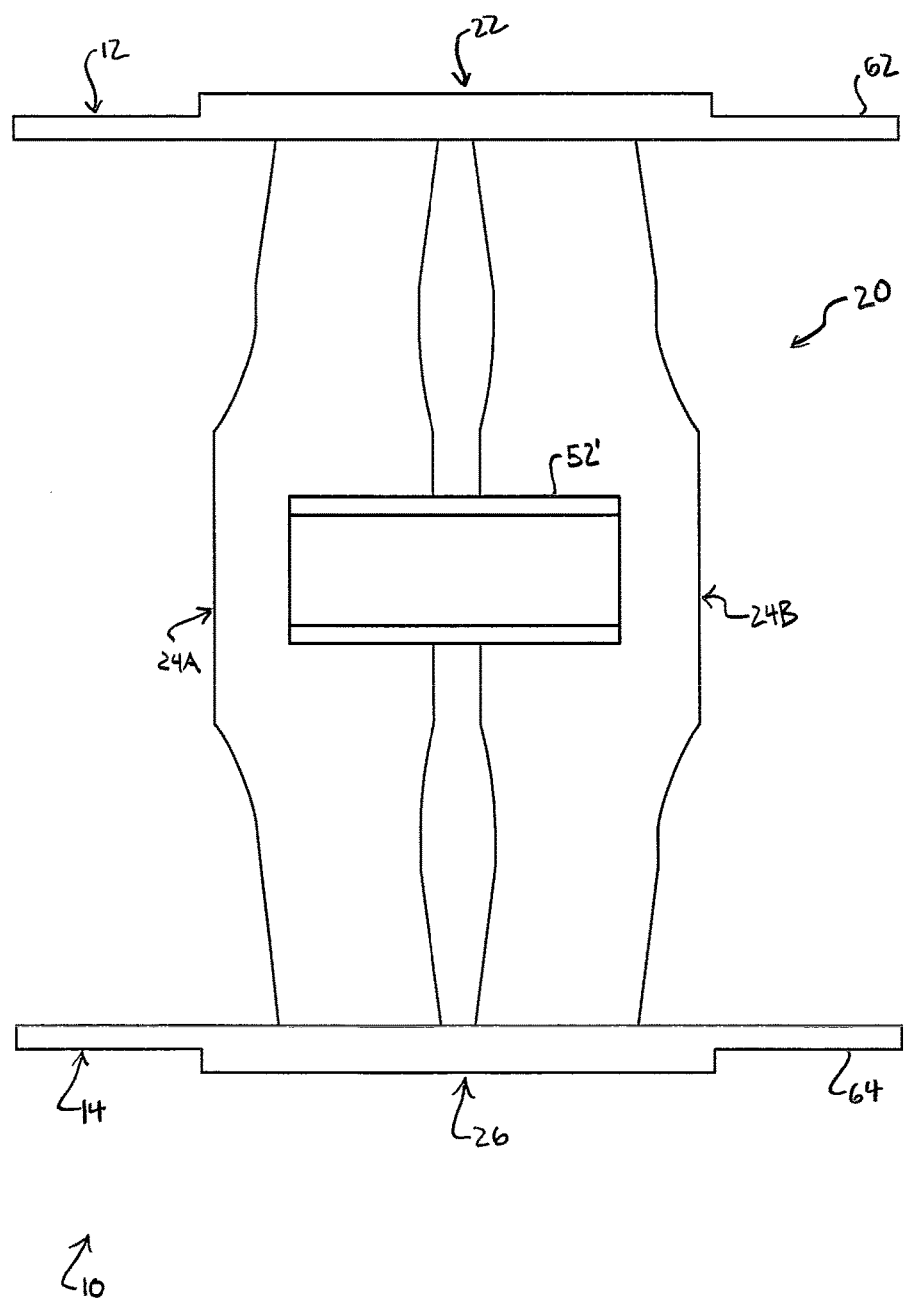
FIG. 2A is a schematic top plan of another embodiment of a split flow vortex meter substantially identical to the flowmeter of FIG. 2 except it has a single transmitter instead of multiple transmitters.

The flowmeter 10 includes a fluid conveyance system, generally indicated at 20 (FIG. 2). The fluid conveyance system 20 conveys the flowing fluid from the meter inlet 16 to the meter outlet 18. The fluid conveyance system 20 suitably includes one or more structures that divide the stream of fluid flowing through the pipeline into multiple flow streams. Turning to FIGS. 2 and 2A, in the illustrated schematic, the fluid conveyance system 20 includes a flow splitter 22, separate flowtubes 24A and 24B for carrying multiple fluid streams (e.g., two fluid streams) through the flowmeter 10, and a flow aggregator 26 configured to recombine the multiple fluid streams into a single fluid stream before the fluid exits the meter. In the illustrated embodiment, the flow splitter 22 is a mirror image of the flow aggregator 26. Though the same structure may be used in reverse orientations for the flow splitter 22 and the flow aggregator 26, different structures may also be used without departing from the scope of the invention.

Figure 5:
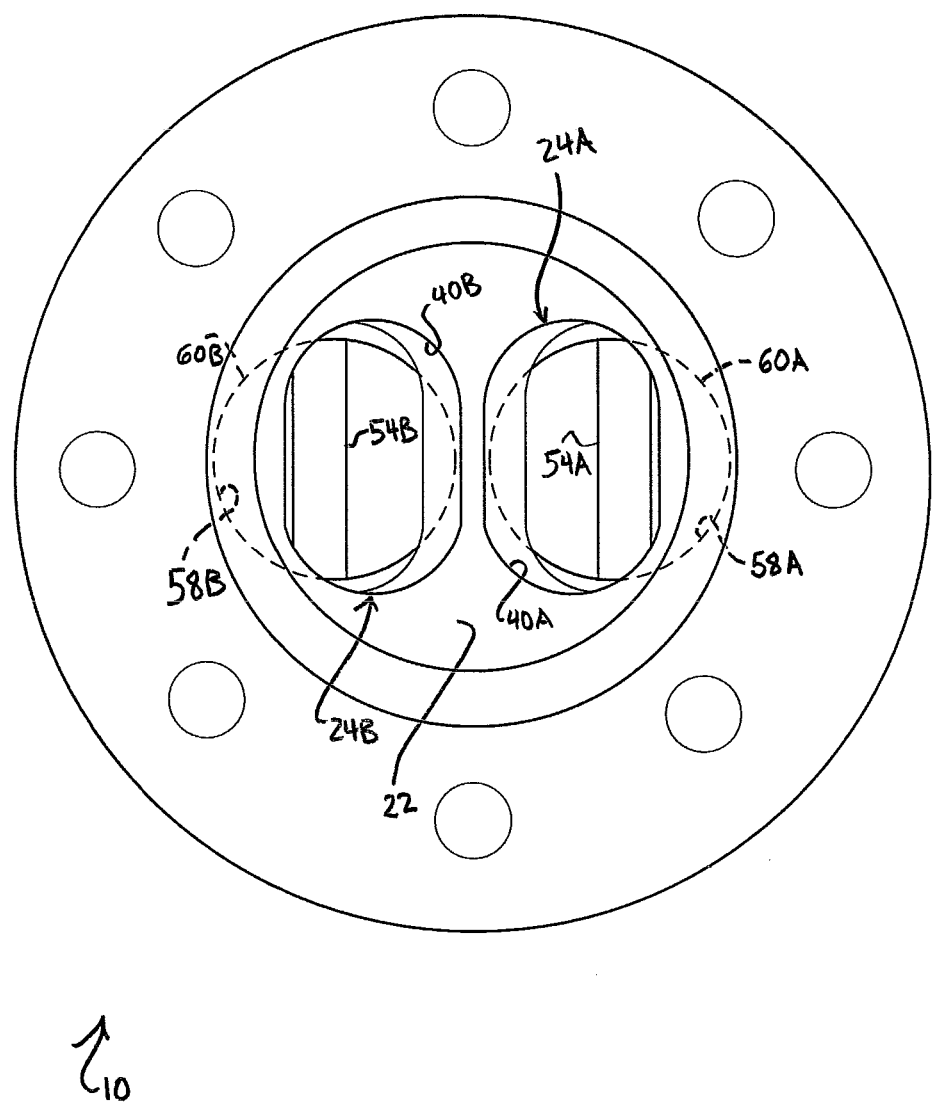
FIG. 5 is a schematic front elevation of the inlet end of the flowmeter of FIG. 1.

Suitably, the separate flowtubes 24A and 24B fluidicly couple the flow splitter 22 to the flow aggregator 26 and carry the separate flow streams between the process connections 12, 14 and between upstream and downstream portions of the pipeline P. Each of the flowtubes 24A, 24B includes a flowtube inlet 30A, 30B, (FIG. 3) positioned adjacent the flow splitter 22 (i.e., at the upstream end of the flowtube), and a flowtube outlet 32A, 32B, positioned adjacent the flow aggregator 26 (i.e., at the downstream end of the flowtube). Referring to FIG. 5, the illustrated flow splitter 22 is a plate with a pair of orifices disposed therein. Each of the orifices is aligned with an inlet 30A, 30B of one of the flowtubes 24A, 24B. As illustrated, the inlets 30A, 30B of the flowtubes 24A, 24B have oblong, non-circular cross-sectional shapes. The plate flow splitter 22 suitably has orifices that are shaped to match the shape of the inlets 30A, 30B. The flow splitter 22 is suitably formed separately from the flowtubes 24A, 24B and installed in the first process connection 12 at the inlets 30A, 30B (e.g., by welding or other suitable techniques). The outlets 32A, 32B of the flowtubes 24A, 24B and the aggregator are suitably shaped and constructed substantially similarly to the inlets 30A, 30B and the flow splitter 22. Although the flow splitter 22 and flow aggregator 36 are suitably formed separately from the rest of the flowmeter 10, it is contemplated the flow splitter 22 and/or flow aggregator 36 can be machined from the same piece of material (e.g., a unitary metal body) as the flowtubes and/or process connections without departing from the scope of the invention.

Figure 3:
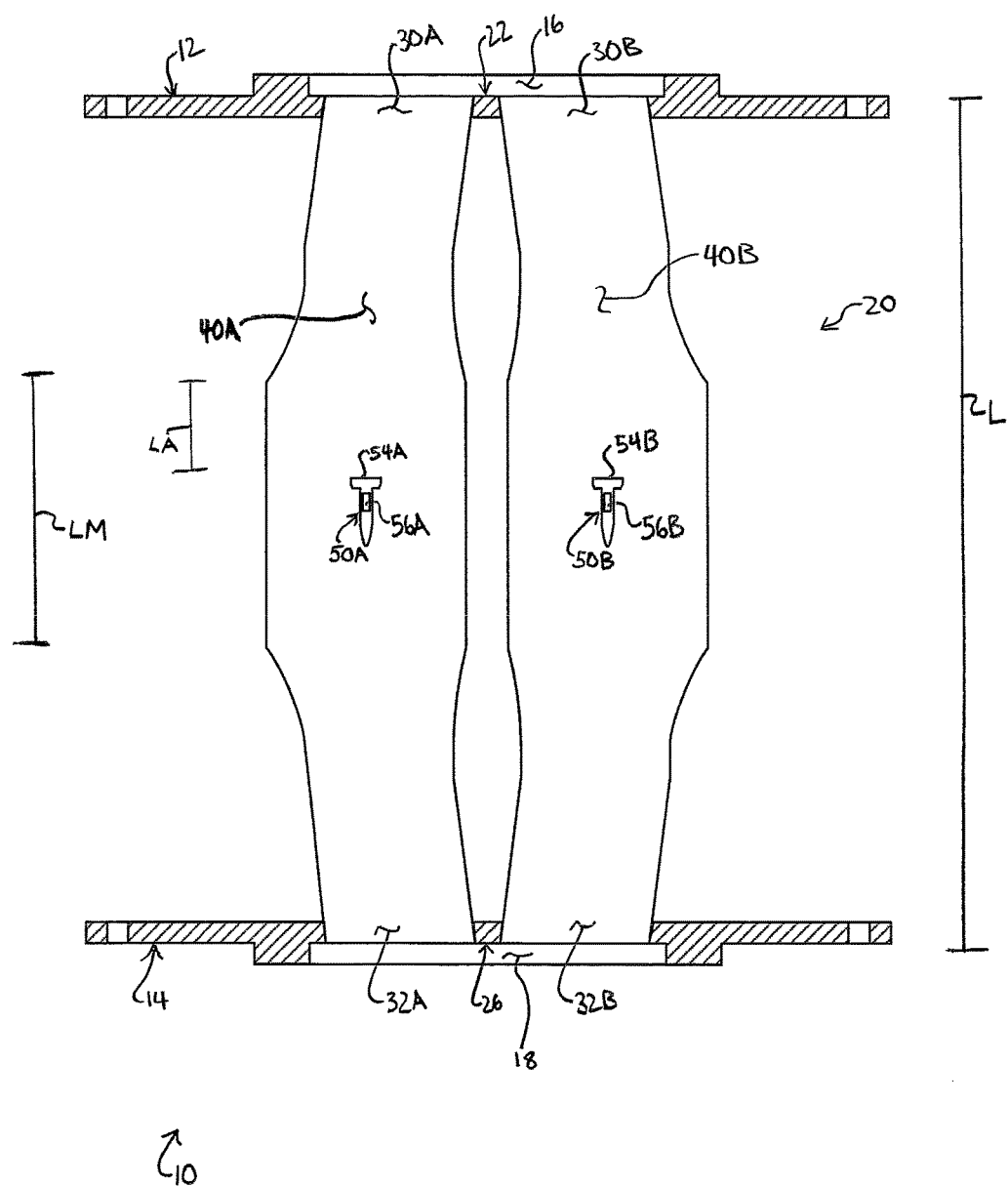
FIG. 3 is a schematic view showing internal features of the flowmeter of FIG. 1.

Turning now to FIG. 3, the fluidic system 20 includes multiple separate passages 40A, 40B configured to divide fluid received by the meter inlet 16 into multiple separate fluid streams and convey the fluid streams to the meter outlet 18. In the illustrated embodiment, the fluid conveyance system 20 is configured to divide the fluid into only two separate streams (e.g., through only two separate passages 40A, 40B). However, as discussed in more detail below, in other embodiments the fluid conveyance system can be configured to divide the flow into three or more separate streams. In the illustrated embodiment, the fluid passages 40A, 40B each have a cross-sectional shape that is substantially a mirror image of the other. Because the fluid passages 40A, 40B have similar cross-sectional shapes, the flow conditions, including the Reynolds numbers, are about the same in each of the passages. However, one or more of the fluid passages can also have a different shape from one or more of the other passages. The vortex flowmeter 10 illustrated in FIGS. 1-5 is configured so each of the multiple fluid streams carries about the same amount of fluid. In the alternative, the fluid conveyance system can be configured so at least one of the multiple fluid streams carries a substantially different amount of fluid than at least one other of the multiple fluid streams.

Suitably, the fluid passages 40A, 40B are plumbed in parallel to be fluidicly connected to the upstream segment of the fluid pipeline P by the upstream process connection 12 and fluidicly connected to the downstream segment of the fluid pipeline by the downstream process connection 14. The flowmeter 10 is configured so all of the fluid flowing through the pipeline P flows through one of the passages 40A, 40B, but none of the fluid flows through both passages. The process fluid enters the flowmeter 10 through the inlet 16 as a single fluid stream, is divided into multiple fluid streams (e.g., two fluid streams) at the flow splitter 22, travels through the fluid passages 40A, 40B, is recombined into a single stream at the flow aggregator 26, and exits the flowmeter at the outlet 18 as a single fluid stream. All of the fluid flowing through any of the multiple passages 40A, 40B enters the flowmeter 10 through a single process connection 12. Moreover, all of the fluid exits the flowmeter 10 through a single process connection 14. There are suitably no process connections in the meter 10 between the upstream process connection 12 and the downstream process connection 14.

Referring again to FIGS. 2 and 3, the flowmeter 10 includes a first vortex metering unit, generally indicated at 50A, and a second vortex metering unit, generally indicated at 50B. First and second vortex metering units 50A, 50B are configured to collectively measure a flow rate of the fluid flowing through the pipeline P. The single upstream process connection 12 connects the vortex metering units 50A, 50B to the upstream segment of the fluid pipeline P. The single downstream process connection 14 connects the vortex metering units 50A, 50B to the downstream segment of the fluid pipeline P. The vortex metering units 50A, 50B are each installed in one of the flowtubes 24A, 24B. The flowtubes 24A, 24B for the first and second vortex metering units 50A, 50B are suitably arranged side-by-side, as illustrated in FIG. 3.

Each of the vortex metering units 50A, 50B suitably include a bluff body 54A, 54B (sometimes referred to in the industry as a "shedder") positioned as an obstruction to fluid flow through the corresponding flowtube 24A, 24B in order to generate vortices in the fluid flow through the respective flowtube. Though shown in a known T-shaped configuration, the bluff bodies 54A, 54B can be any shape suitable to generate vortices in the flow streams downstream of the bluff bodies without departing from the scope of the present invention. As illustrated, each of the passages 40A, 40B has an identical bluff body 54A, 54B in each of the substantially identical fluid passages 54A, 54B. However, the bluff bodes can be different from one another (e.g., in size and/or shape) within the scope of the invention whether or not the passages of the flowtubes are identical.

Each vortex metering unit 50A, 50B also includes one or more sensors 56A, 56B positioned to detect vortices in the respective passages 40A, 40B. For example, when vortex shedding is present, the pressure and velocity fields of the flow passages 40A, 40B in the vicinity of and/or downstream of the bluff bodies 54A, 54B will oscillate at the vortex shedding frequency. Thus, the sensors 56A, 56B can suitably be pressure or velocity sensors used to transform the oscillation of one of the pressure field or velocity field into an electrical signal. Other types of sensors may also be used, additionally or alternatively, to detect the generation of vortices downstream of the bluff bodies in each of the multiple passageways without departing from the scope of the invention.

Figure 4:
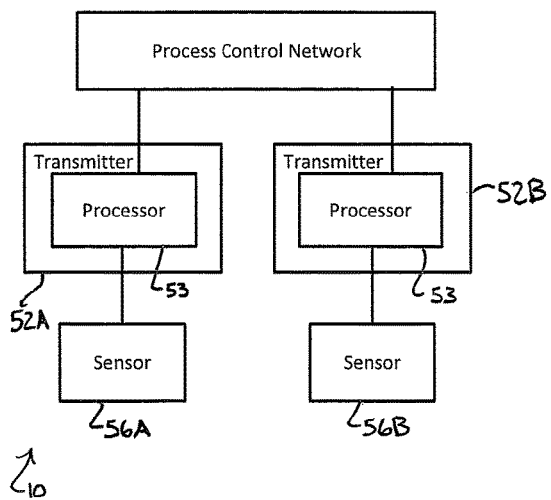
FIGS. 4-4C are block diagrams illustrating various possible arrangements of a processing system for the flowmeter of FIG. 2.

As shown in FIG. 4, each vortex metering unit 50A, 50B can include a processing system configured to receive the output of the sensor 56A, 56B and convert it into a flow rate measurement. The term "processing system" refers to one or more physical modules, components, or processors capable of executing processor-executable instructions to process signals from the sensors 56A, 56B and determine a flow rate from the signals. For example, the flow rate can be a volumetric flow rate and/or a mass flow rate. The processing system can be configured to receive outputs from the sensors of multiple vortex metering units and one or more additional sensors, such as, by way of example only, temperature sensors or line pressure sensors, in which case the processing system can implement processor-executable instructions to provide a compensated measurement or some other measurement based on a combination of the outputs it receives.

The vortex metering units 50A, 50B can be substantially identical to conventional vortex meters except that the bluff body, sensor, and electronics are installed in one of the passages 40A, 40B instead of a conventional flowtube. Thus, the vortex metering units 50A, 50B can include substantially only off the shelf components used to make conventional vortex meters. For example, in FIGS. 2 and 4, each vortex metering unit 50A, 50B includes its own transmitter 52A, 52B, which can be substantially identical to a transmitter for any conventional vortex flowmeter. Each transmitter 52A, 52B may have its own processor 53 for providing a measurement (FIG. 4). In this case the processing system can include the processors contained within the conventional transmitters. In this embodiment, the processing system may also include an additional processing component (e.g., running on a process control network) that calculates a sum of the flowrate measurements for each of the vortex metering units 50A, 50B.

Figure 4A:
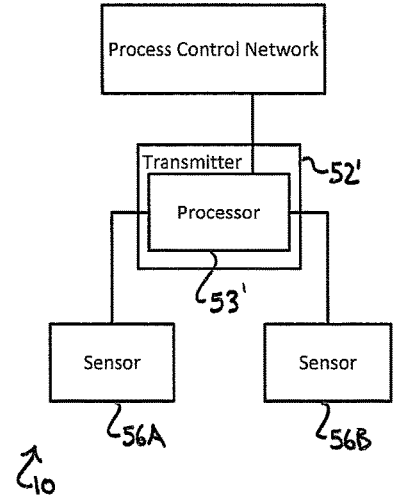
Figure 4B:
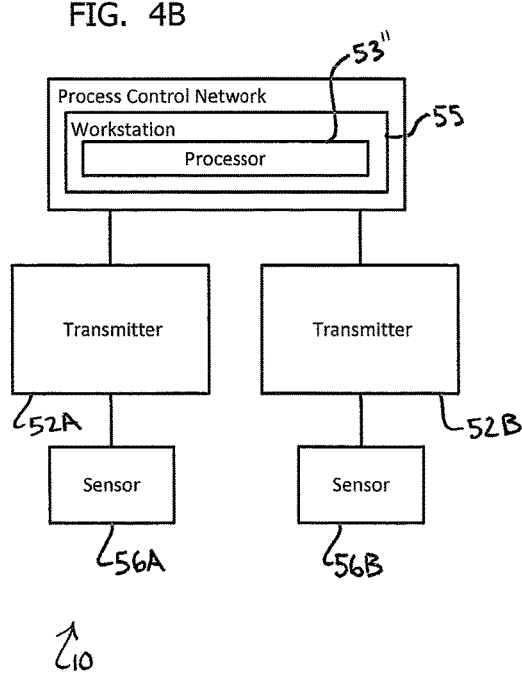
Figure 4C:
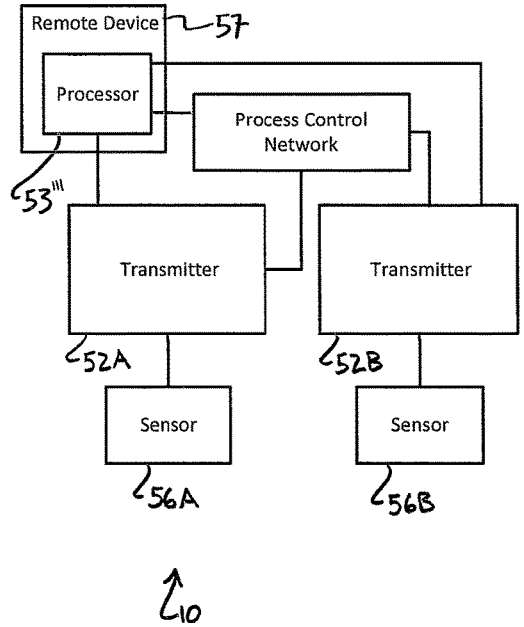

As illustrated in FIGS. 2A and 4A, the vortex metering units 50A, 50B share a single transmitter 52' and processor 53' configured to provide a measurement representing at least the sum of flow measurements from each vortex metering unit 50A, 50B. The single transmitter 52' and processor 53' suitably also determine, record, and/or totalize flow through each of the multiple passages 40A, 40B. As illustrated in FIGS. 4B and 4C, processor-executable instructions may be implemented on a processor remote from the vortex metering units 50A, 50B (e.g., at a processor 53" of a process control workstation of a distributed control system (FIG. 4B) or a processor 53''' of a remote device 57 (FIG. 4C), such as a wireless device) to provide a measurement. Processing systems that implement processor-executable instructions to provide a measurement based on the output of vortex metering units can be configured to carry out other unrelated instructions simultaneously or at other times without departing from the scope of the invention.

The processing system suitably configured to measure the individual flow rates of the fluid streams flowing through each of the multiple fluid passages. The processing system is suitably configured to calculate the sum of the flow rates through each individual fluid stream and thereby calculate the flow rate of the fluid flowing through the pipeline P by calculating a sum of totalized flow through the individual metering units 50A, 50B. Likewise, the processing system may be configured to calculate the totalized flow of the fluid through the process pipeline P. For example, the processor 53 is suitably connected to each of the sensors 56A, 56B to receive each of the signals therefrom and calculate an instantaneous flow rate measurement representative of the flow rate through the fluid pipeline P and/or the sum of flow rate measurements from the first and second vortex metering units 50A, 50B. Alternatively, the processor 53 is suitably configured to calculate total flow rate and/or combined totalization directly from the sensor signals without calculating corresponding individual flow rates for each metering unit 50A, 50B.

As discussed above, in large-diameter pipelines (e.g., pipelines having a pipe diameter that is at least ten inches), conventional vortex flowmeters may not provide accurate and consistent measurements, especially when the fluid flow rate is low. The flowmeter 10 illustrated in FIGS. 1-5 facilitates use of vortex metering technology with large diameter pipelines. Accordingly, the first and second process connections 12, 14 are suitably configured to connect the flowmeter 10 to a fluid pipeline P having a diameter D (FIG. 1) that is at least ten inches, more suitably configured to connect the flowmeter to a fluid pipeline having a diameter in the range of about 12 inches to about 72 inches, and still more suitably configured to connect the flowmeter to a fluid pipeline having a diameter in the range of about 12 inches to about 36 inches. Likewise, the flowmeter 10 suitably has the capacity to measure the flow rate and/or totalized flow of fluid flowing through a pipeline P having a diameter in the range of about 12 inches to about 72 inches, and still more suitably configured to connect the flowmeter to a fluid pipeline having a diameter in the range of about 12 inches to about 36 inches.

The passages 40A, 40B each have a fixed cross-sectional flow area geometry along a segment having a length LA (FIG. 3) extending upstream of the shedder to facilitate stable vortex generation. The fixed cross-sectional geometry can also extend along the entire passage length L. In the illustrated embodiment, the fixed cross-sectional flow area extends along the length LM of the passages 40A, 40B. At least one of the multiple flowtubes or passages can have a fluid flow area having a substantially circular cross-sectional shape. Turning to FIG. 5, for example, flow passages 40A, 40B are shown, in part schematically. As illustrated, each of the multiple passages 40A, 40B, has a circular cross-sectional flow area 58A, 58B (partially illustrated with hidden lines) along the length LM. Likewise, each of the multiple flowtubes 24A, 24B has a substantially circular cross-sectional shape along the length LM. The substantially circular cross-sectional flow area suitably extends uniformly along at least the ante-shedder length LA of the passages 40A, 40B. For example, the substantially circular cross-sectional flow area suitably extends uniformly along the entire meter section length LM of passages 40A, 40B, as illustrated in FIG. 3. Further, the substantially circular cross-sectional flow area can extend uniformly along the entire passage length L without departing from the scope of the invention.

Likewise each substantially circular cross-sectional flow area 58A, 58B can be bounded by an inner perimeter of the respective flowtube 60A, 60B of the respective flowtube 24A, 24B. The size of the substantially circular cross-sectional flow area of each meter section of a fluid passage 40A, 40B is suitably between about 79 square-inches and about 28 square inches, although the size can be outside of this range without departing from the scope of the invention.

As shown in FIG. 3, each of the fluid passages 40A, 40B suitably bows outwardly away from the other as they extend away from the upstream process connection 12. At the inlets 30A, 30B of the flowtubes 24A, 24B, the passages 40A, 40B have an oblong, non-circular cross-sectional areas (see FIG. 5) that correspond with the cross-sectional areas of the orifices in the flow splitter 22. The oblong, non-circular cross-sectional area of the orifices in the flow splitter 22 advantageously uses a majority of the cross-sectional area in the opening of the process connection 12 (FIG. 5). Further, a segment of tubing having a circular cross-sectional shape can easily be manufactured to conform to the shape of the orifices in the flow splitter 22 by compressing the end of the circular tubing to deform it into the oblong shape. The flowtubes 24A, 24B suitably transition gradually from the oblong cross-sectional shape at the inlets 30A, 30B to the substantially circular cross-sectional shape as each flowtube extends away from the upstream process connection 12. The bowed configuration of the passages 40A, 40B upstream of the length LA provides space for the widths of the passages to expand as they transition toward their substantially circular cross-sectional shape. The shape and configuration of the conduits 24A, 24B downstream of the bluff bodies 54A, 54B in the illustrated embodiment is suitably substantially symmetric with the shape and configuration upstream of the bluff bodies. Thus, the description above for the upstream half of the conduits 24A, 24B will suffice to describe the downstream half of the conduits.

The system 10 suitably has a relatively compact form factor that facilitates installation of flow meter 10 at a single place along a generally continuous process pipeline P (e.g., in an industrial process environment). For example, the flowmeter 10 is suitably movable and/or interchangeable with respect to the pipeline P in which it is installed. When the upstream and downstream process connections 12, 14 of the illustrated embodiment are not connected to any fluid pipeline P, the entire system 10 including all of the multiple vortex metering units 50a, 50B can be transported as a unit. Further, when the system 10 is disconnected from the pipeline P, the assembly of first and second vortex metering units 50A, 50B connected between upstream and downstream process connections 12, 14 may be purchased, shipped, installed, removed, moved, or reinstalled as one integral unit, without undue logistical effort, assembly, or disassembly. Additional components may also be included without departing from the scope of the invention. Although it may be desirable to manufacture and sell the entire system 10 as an integrated system, it is recognized that various components of the system may be manufactured and/or sold separately without departing from the scope of the invention.

Returning to FIG. 2, the upstream process connection 12 has an upstream pipeline-adjacent face 62, and the downstream process connection 14 has a downstream pipeline-adjacent face 64. The pipeline adjacent faces 62, 64 suitably lie on generally parallel planes oriented so they are generally orthogonal to the pipeline P when installed. As illustrated in FIG. 1, when the flowmeter 10 is installed in the pipeline P, the conduits 24A, 24B extend axially between the pipeline-adjacent faces 62, 64. The conduits 24A, 24B are also suitably generally aligned with the pipeline P when the meter is installed. Suitably, the long axis of the flowmeter 10 can be oriented generally in the same direction as the direction of the flow in each of the segments of pipeline P immediately upstream and downstream of the flowmeter. Although the process connections 12, 14 in the illustrated embodiment are so-called flange type connections, so-called wafer style and other types of connections could be used instead.

In one embodiment of a method of using the flowmeter 10, a fluid is flowed through an upstream pipe segment of the fluid pipeline P (FIG. 1). The fluid flows into the flowmeter 10 through its inlet 16 (FIG. 3) and enters the fluid conveyance system 20. The flow splitter 22 divides the fluid into multiple streams as the fluid flows through the fluid conveyance system 20. Each of the multiple fluid streams flows through a separate passage 40A, 40B in a respective flowtube 24A, 24B. The bluff bodies 54A, 54B partially obstruct the flowing fluid in the respective fluid stream, which generates a series of vortices downstream of the bluff bodies. The multiple fluid streams are recombined by the flow aggregator 26. The recombined fluid flows out of the flowmeter 10 through its outlet 18 and flows through the downstream pipe segment of the fluid pipeline P. The sensors 56A, 56B sense the vortices that are generated downstream of the bluff bodies 54A, 54B and provide an output representative of the sensed vortices to a processing system 53. The processing system 53 receives the output and executes processor-executable instructions to use the received output to calculate a measurement of the instantaneous flow rate of the fluid through the pipeline P (e.g., by analyzing the frequency at which vortices are sensed by the sensors 56A, 56B). The flow rate measurement is suitably provided to a process control network for use in controlling a process. The flow rate measurement can be monitored over a period of time to measure the total flow through the pipeline P for the period of time. Because each of the multiple passages 40a, 40B has a cross-sectional flow area that is less than the cross-sectional flow are of the pipeline P, the vortex metering units 50A, 50B are not as vulnerable to the potential undesirable effects that can be associated with use of vortex metering technology in a setting involving a large cross-sectional flow area.

Figure 6:
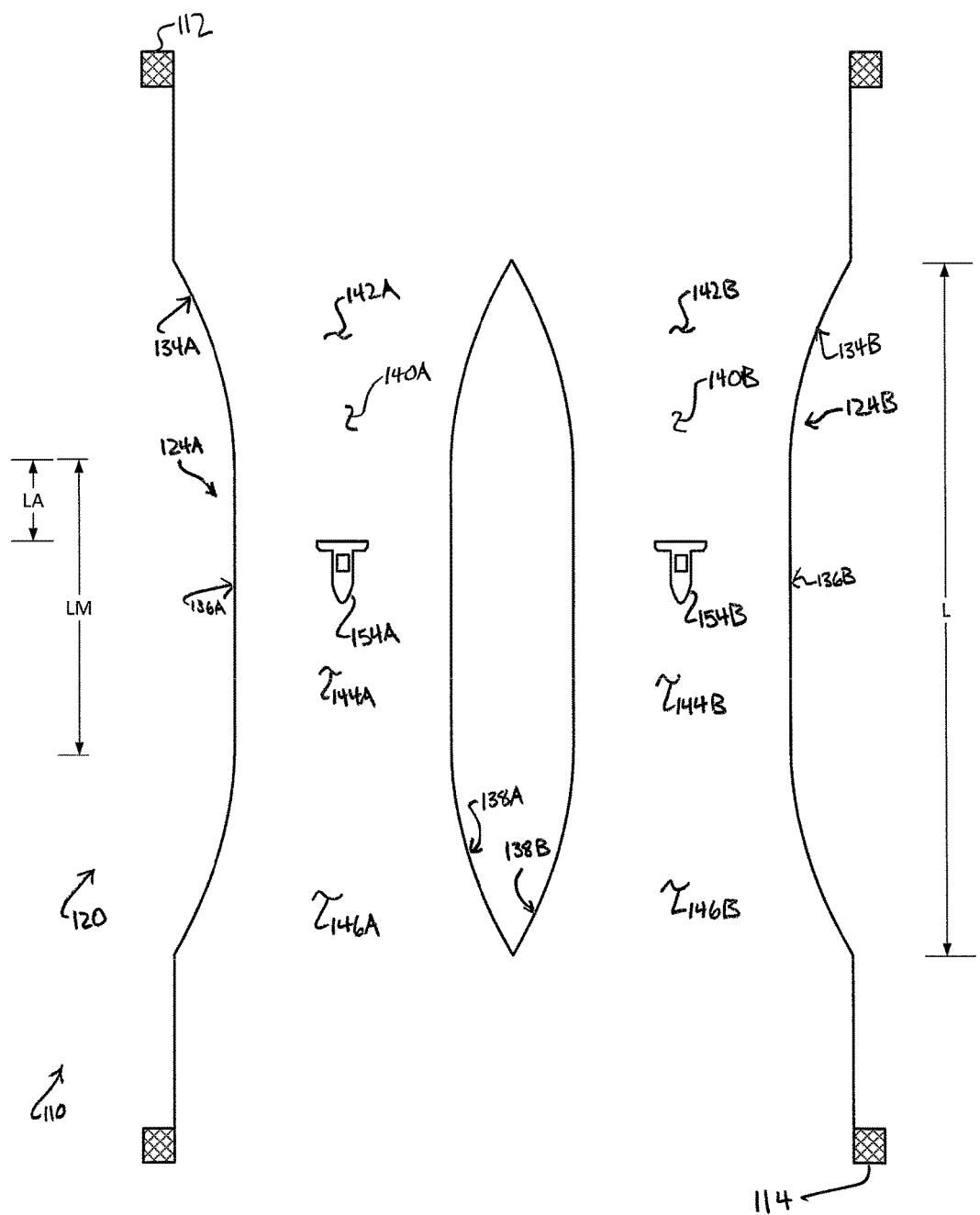
FIG. 6 is a schematic section view schematic similar to FIG. 3 showing another embodiment of split flow vortex flowmeter.
Figure 7:
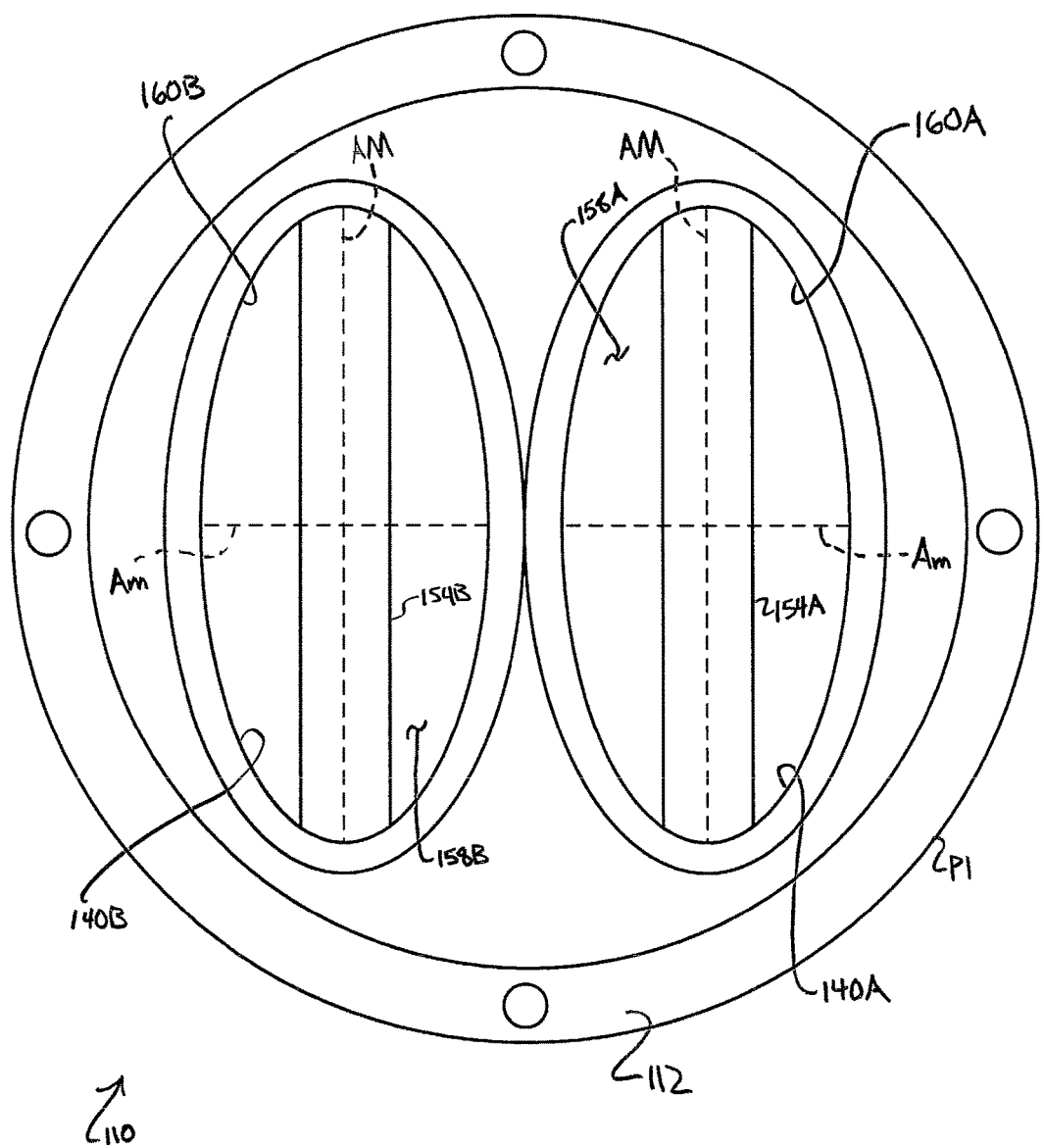
FIG. 7 is a schematic front elevation of the inlet end of the flowmeter of FIG. 6.

Another embodiment of a split flow vortex flowmeter is generally indicated at 110 in FIGS. 6-7. The flowmeter 110 is substantially identical to the flowmeter 10 illustrated in FIGS. 1-5 except as noted. As illustrated in FIGS. 6-7, each of the passages 140A, 140B is configured to constrict fluid as the fluid flows by the respective bluff body 154A, 154B to increase velocity of the fluid flow at the bluff body to facilitate stable vortex generation under low flow conditions.

Referring to FIG. 6, the flowtubes 124A, 124B each have a reducer section 134A, 134B, a meter section 136A, 136B, and an expander section 138A, 138B. U.S. Pat. No. 7,533,579, which is assigned to the same assignee as the present invention and which is hereby incorporated by reference, describes in detail how a reducer section can be used to increase fluid velocity in the flowtubes 124A, 124B. The passages 140A, 140B in the flowtubes 124A, 124B each have a profile that generally corresponds to that of the respective fluid flowtubes 124A, 124B. The flowtubes 124A, 124B each have a generally uniform wall thickness such that the profiles of the fluid passages 140A, 140B have reducer sections 142A, 142B, meter sections 144A, 144B, and expander sections 146A, 146B corresponding with the shapes of respective reducer sections 134A, 134B, meter sections 136A, 136B, and expander sections 138A, 138B of the flowtubes. As illustrated in FIG. 7, each reducer section 134A, 134B and expander section 138A, 138B has a generally tapered, smoothly curved profile in the illustrated embodiment. However, the reducer sections and/or expander sections may take other forms (e.g., conical, stepped, etc.) instead.

At least one of the multiple flowtubes passages 140A, 140B suitably has a fluid flow area having a non-circular cross-sectional shape. For example, as illustrated in FIG. 7, each of the multiple passages 140A, 140B, has a non-circular cross-sectional flow area 158A, 158B. Likewise, each of the multiple flowtubes 124A, 124B has a non-circular cross-sectional shape. More specifically, the cross-sectional flow areas 158A, 158B each have a generally oblong oval shape. The non-circular cross-sectional flow area suitably extends uniformly along at least the ante-shedder length LA of the passages 140A, 140B. Further, the non-circular cross-sectional flow area suitably extends uniformly along the entire meter section length LM of the passages 140A, 140B. For example, the non-circular cross-sectional flow area suitably extends uniformly along the entire passage length L. Likewise each non-circular cross-sectional flow area 158A, 158B may be bounded by a non-circular cross-sectional inner perimeter 160A, 160B of the respective flowtube 124A, 124B.

Referring to FIG. 7, the non-circular cross-sectional flow areas 158A, 158B each have a major axis AM and minor axis Am, the major axis being longer than the minor axis. In the illustrated embodiment the bluff bodies 154A, 154B are each oriented generally perpendicularly to the respective minor axes Am. The bluff bodies 154A, 154B are oriented generally parallel to the major axes AM. In the illustrated embodiment, the fluid conveyance system 120 is configured so there are only two passages 140A, 140B, and the passages are positioned generally side-by-side and oriented so their major axes AM are generally parallel. Moreover, the major axes AM of the two passages 140A, 140B are spaced apart at a generally consistent distance along the entire respective meter section lengths LM. The meter section lengths LM of the multiple passages 140A, 140B are suitably substantially identical, as in the case the embodiment in FIGS. 6 and 7. However, the passages can have different sizes and/or shapes instead. Also, although the passages 140A, 140B of the illustrated embodiment are substantially straight, the passages may be curved or otherwise non-straight. Further, the meter section lengths LM of each passage may be different from one or more other passages within the scope of the invention.

Referring to FIG. 7, the upstream process connection 112 has a perimeter P1 defining the outer geometric extent of the process connection. The multiple passages 140A, 140B are collectively confined within a geometric space that extends between the upstream and downstream process connections 112, 114 and has a cross-sectional area circumscribed by the perimeter P1 of the upstream process connection. Moreover, each of the multiple passages is suitably confined within a cross-sectional area that does not exceed the area encompassed by the perimeter of the process connection 112. The multiple flowtubes 124A, 124B are suitably sufficiently compact that the entire fluid conveyance system 120 can be passed through the inside of a closed loop of string having a fixed length equal to the perimeter of the process connection 112.

The flowmeter 110 operates similarly to the flowmeter 10 described above, except that it accelerates the fluid as it flows through the reducer sections 134A, 134B. Thus, the fluid has a higher velocity at the bluff bodies 154A, 154B than it would without the reducer sections 134A, 134B. The higher velocity of the fluid facilitates accurate metering of the fluid flow rate when the flow rate through the pipeline P is low.

Figure 8:
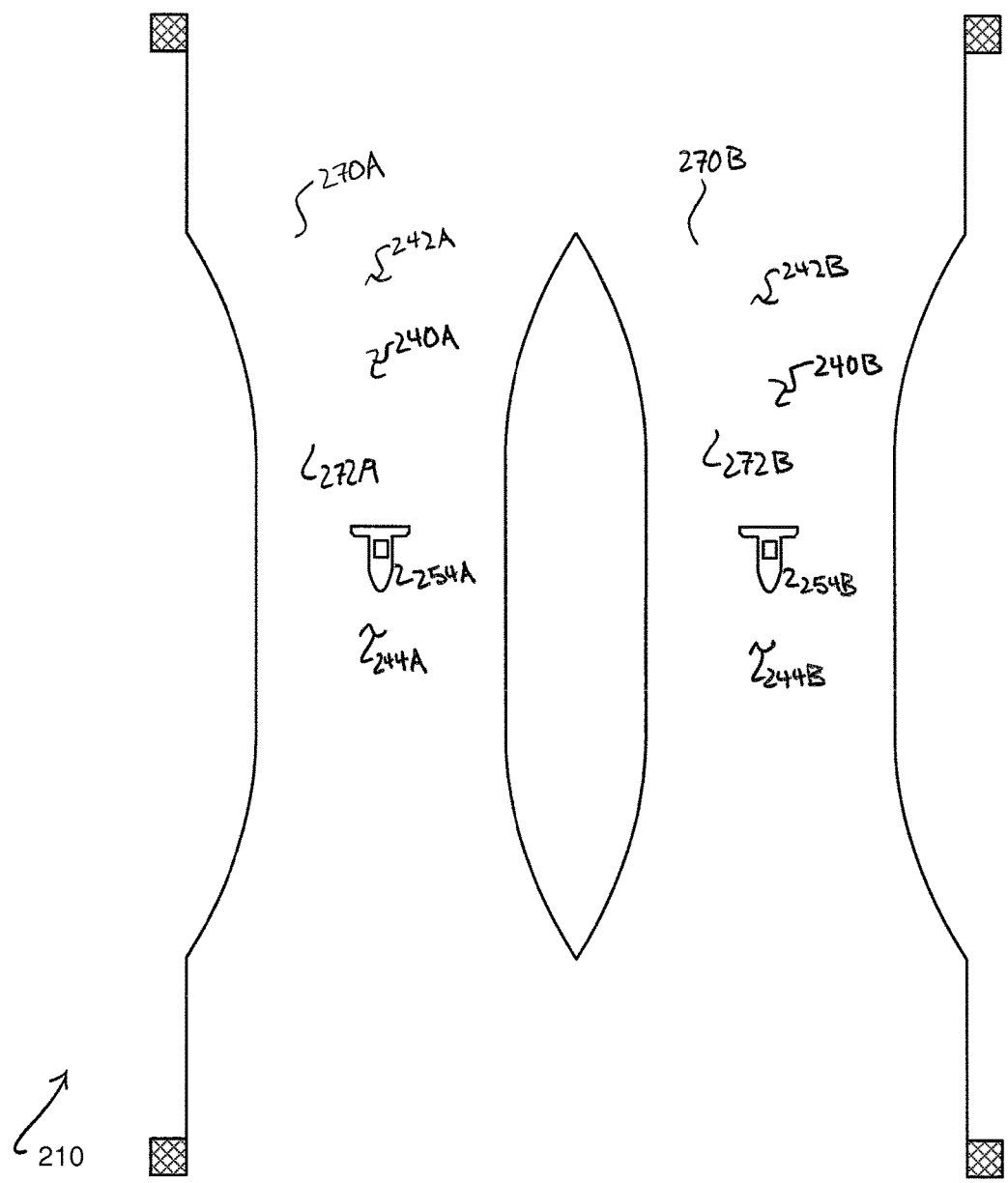
FIG. 8 is a schematic section view schematic similar to FIG. 3 showing another embodiment of a split flow vortex flowmeter.
Figure 9:
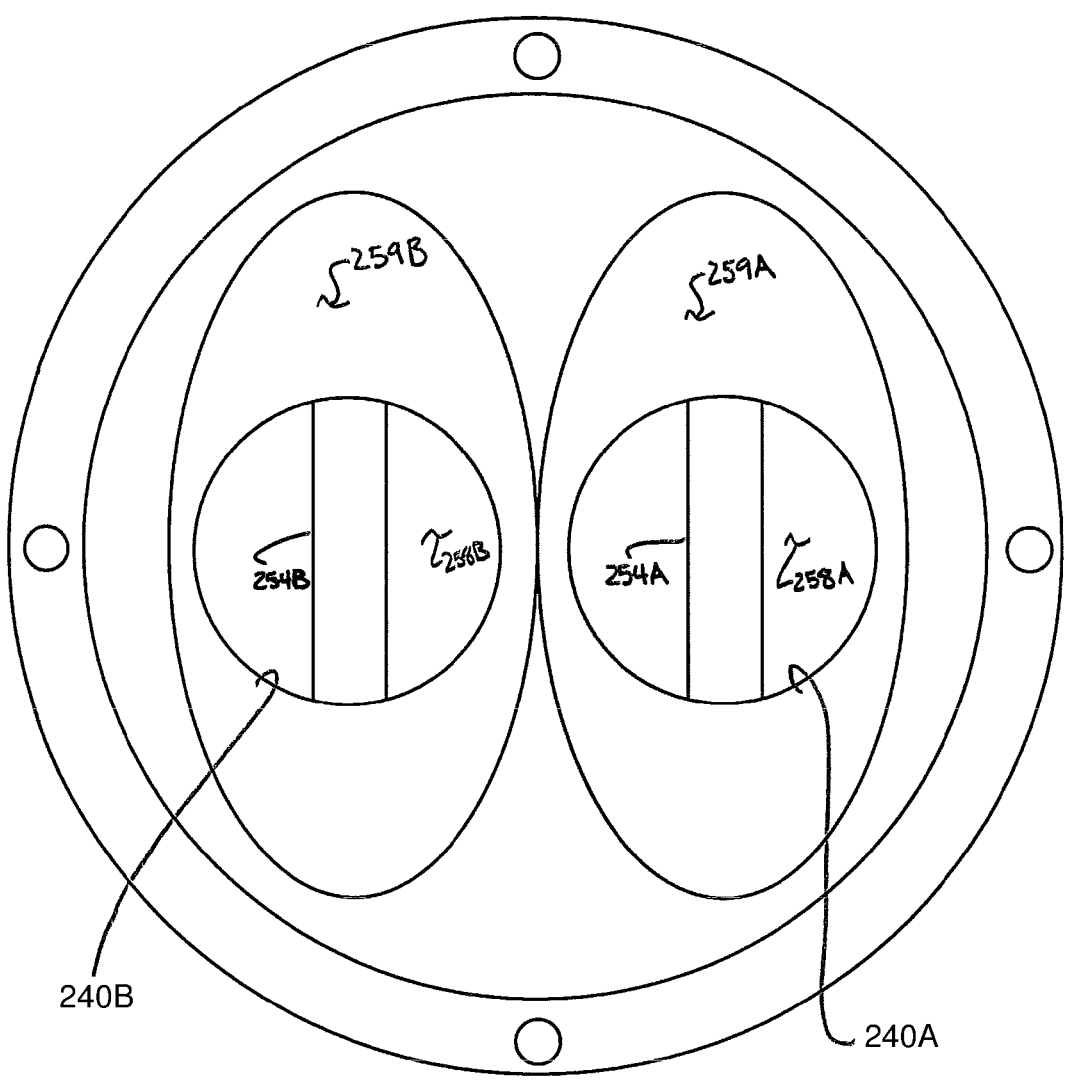
FIG. 9 is a schematic front elevation of the inlet end of the flowmeter of FIG. 8.

Another embodiment of a split flow vortex flowmeter is generally indicated at 210 in FIGS. 8-9. The flowmeter 210 is substantially identical to the flowmeter 110 illustrated in FIGS. 6-7 except as noted. Corresponding features are given corresponding reference numbers, plus 100. FIG. 9 shows the cross-sectional flow areas of the passages 240A and 240B. In FIG. 9, each of the passages 240A and 240B has a non-circular cross-sectional shape 259A, 259B along a first segment of the passage, specifically on the reducer section 242A, 242B of each passage. Further, each of the passages 240A and 240B has a circular cross-sectional shape 258A, 258B along a second segment of the passage corresponding with the metering section 244A, 244B of the passage. Thus, as shown in FIG. 8, each of the passages 240A, 240B has a first segment 242A, 242B and a second segment 244A, 244B. Each first segment 242A, 242B has a first end 270A, 270B adjacent the first process connection 212 and a second end 272A, 272B connected to the respective second segment 244A, 244B. The first segment 242A, 242B tapers down from its first end to its second end to reduce the cross-sectional area of fluid flow in the passage 240A, 240B to the cross-sectional area of the second segment 244A, 244B. The bluff bodies 254A, 254B are mounted in the second segment 244A, 244B of each of the passages 240A, 240B, and the second segment suitably has a substantially uniform cross-sectional area 258A, 258B along its length. For example, as illustrated in FIG. 9 each of the passages 240A, 240B has a cross-sectional area 258A, 258B that is substantially circular along the length of the second segment 244A, 244B. The illustrated embodiment provides one example of a suitable funnel-type reducing transition for a reducer section. However, reducer sections having different shapes may be used without departing from the scope of the invention.

Figure 10:
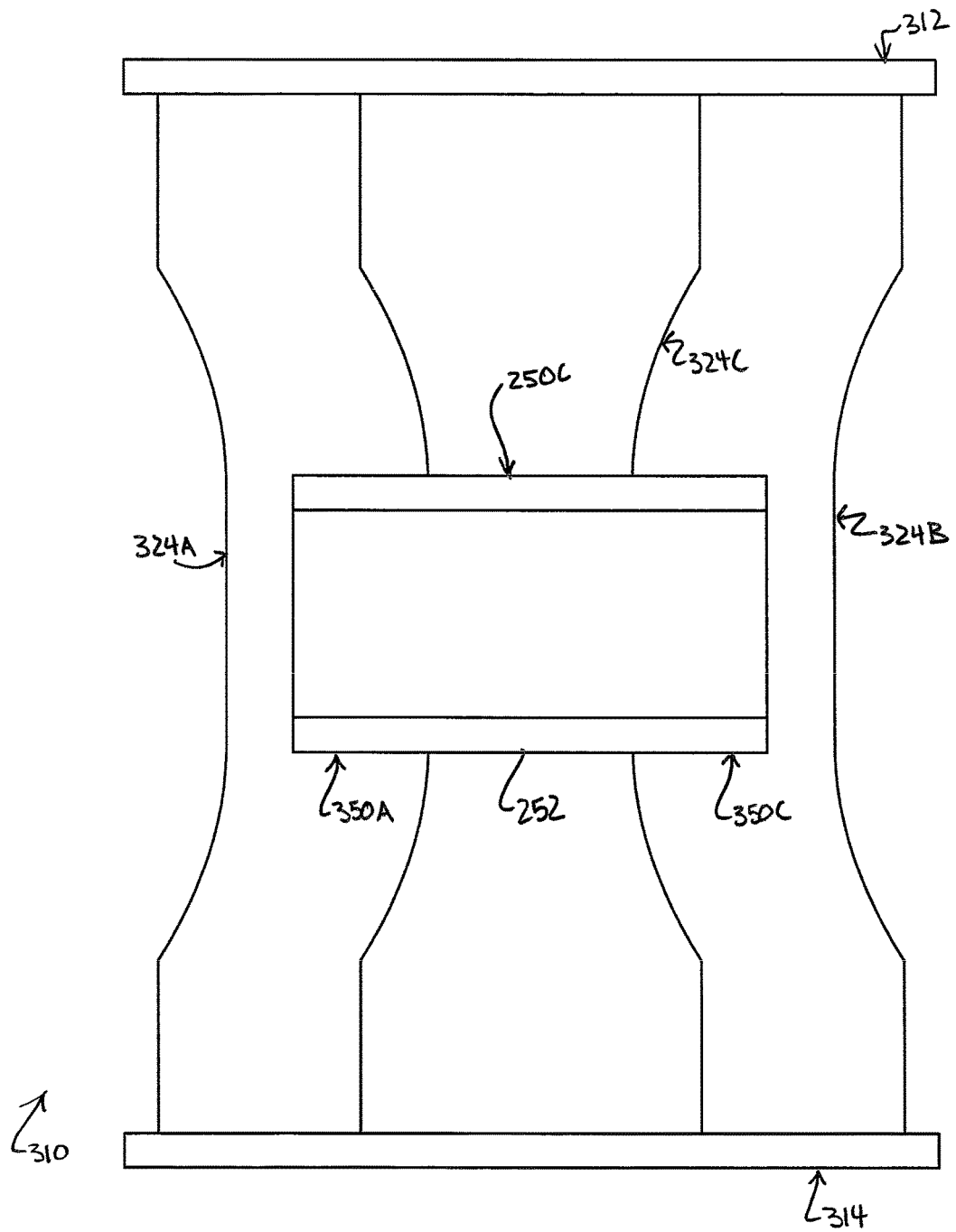
FIG. 10 is a schematic top plan of another embodiment of a split flow vortex flowmeter.
Figure 11:
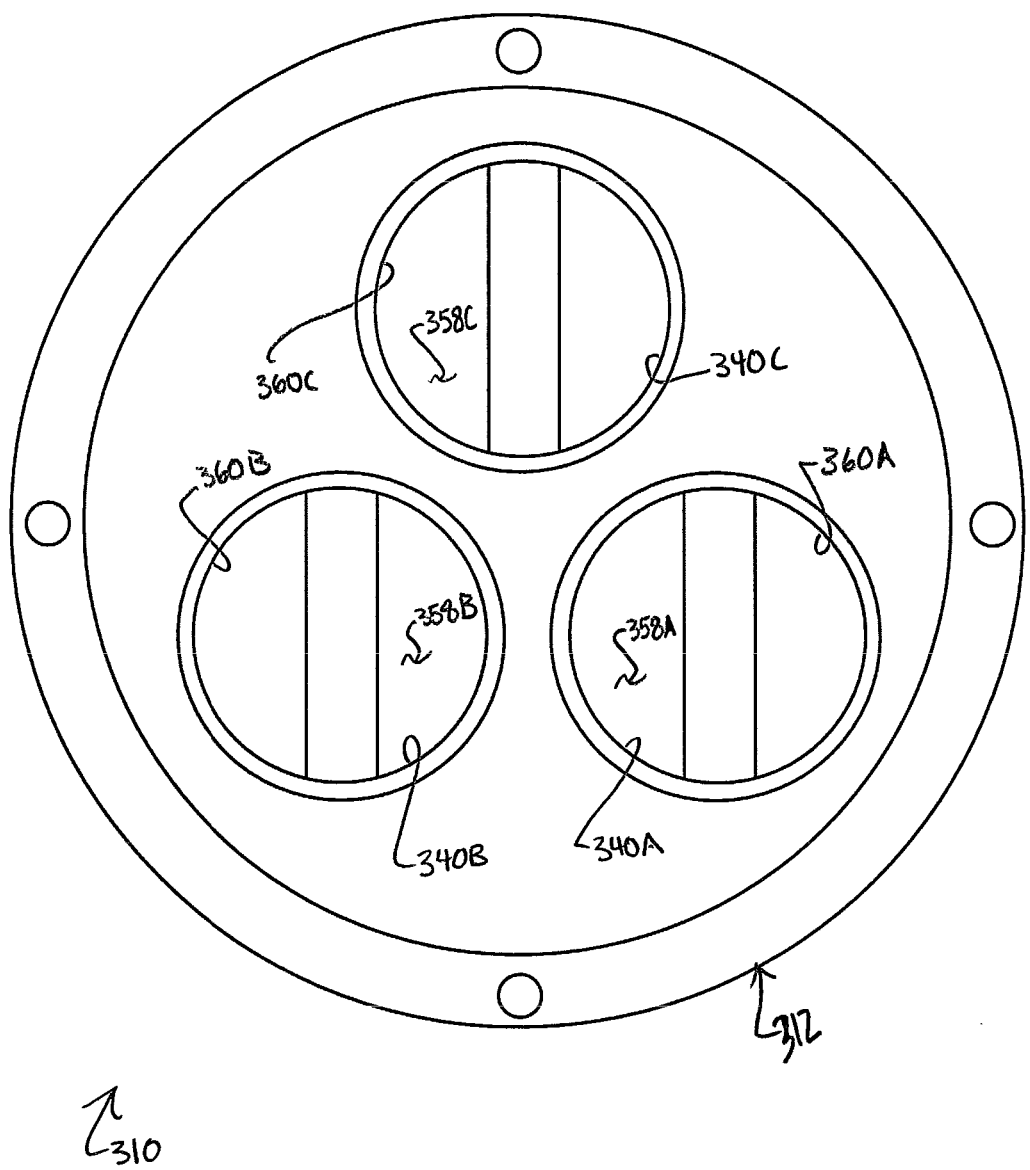
FIG. 11 is a schematic front elevation of the inlet end of the flowmeter of FIG. 10.

Turning now to FIGS. 10-11, another embodiment of a split flow vortex flowmeter is indicated generally at 310. The flowmeter 310 is substantially identical to the flowmeter 110 illustrated in FIGS. 6-7 except as noted. Corresponding features are given corresponding reference numbers, plus 200. In the embodiment shown schematically in FIGS. 10-11, the upstream process connection 312 connects first, second, and third vortex metering units 350A, 350B, 350C to the end of the upstream segment of the fluid pipeline P. Likewise, the downstream process connection 314 connects first, second, and third vortex metering units 350A, 350B, 350C to the end of the downstream segment of the fluid pipeline P. Each of the three vortex metering units 350A, 350B, 350C includes a corresponding flowtube 324A, 324B, 324C with a fluid passage 340A, 340B, 340C to carry one of three separate fluid streams from the first process connection 312 to the second process connection 314. It is understood that still more than three flowtubes and more than three vortex metering units can be included in a single flowmeter if desired. For each additional flowtube, the cross-sectional flow area of the single fluid passage associated with the respective vortex metering unit can be smaller while maintaining an equal or greater total cross-sectional across all the multiple passages. In the illustrated embodiment, each of the multiple passages 340A, 340C, 340B has a circular cross-sectional flow area 358A, 358B, 358C that extends uniformly along the entire meter section length of the passages 340A, 340B, 340C. However, each of the three or more passages can have cross sectional flow areas that differ in size and shape from the illustrated embodiment.

Figure 12:
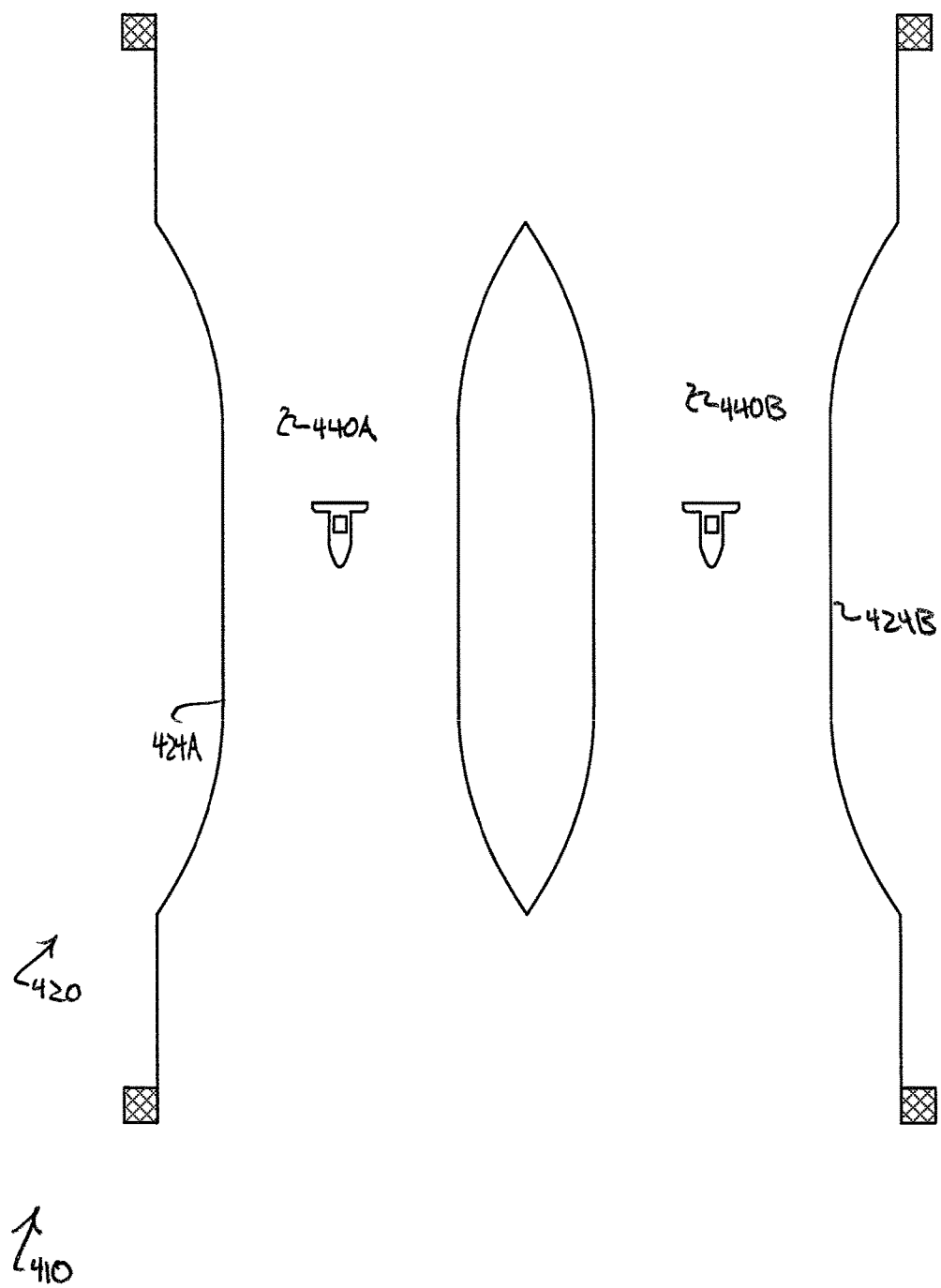
FIG. 12 is a schematic section view similar to FIG. 3 showing another embodiment of a split flow vortex flowmeter.
Figure 13:
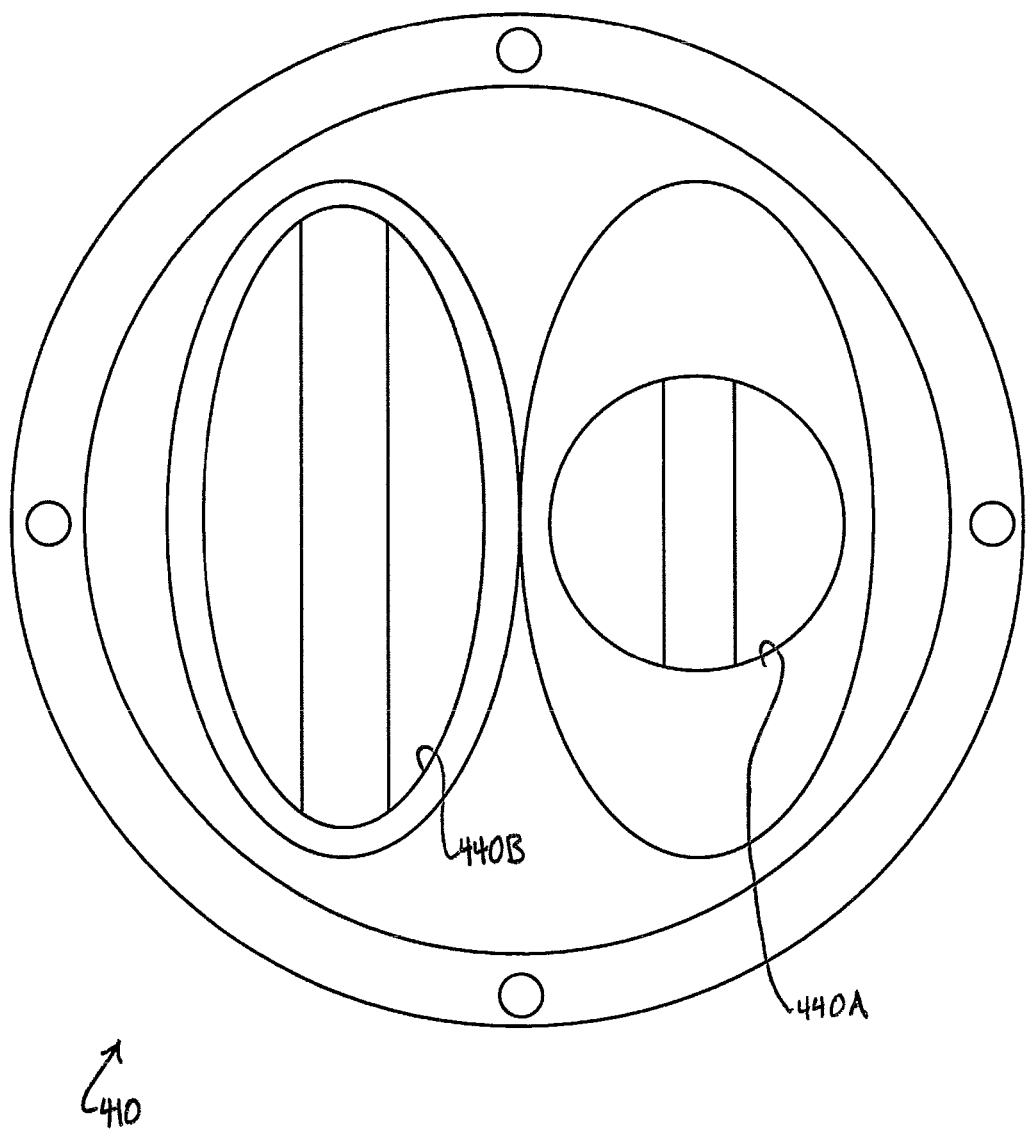
FIG. 13 is a schematic front elevation of the inlet end of the flowmeter of FIG. 12.

Another embodiment is illustrated in FIGS. 12-13 and generally designated 410. The flowmeter 410 is substantially identical to the flowmeter 110 illustrated in FIGS. 6-7 except as noted. Corresponding features are given corresponding reference numbers, plus 300. The fluid conveyance system 420 of the flowmeter 410 is configured so at least one of the multiple fluid streams carries a substantially different amount of fluid than at least one other of the fluid streams. As discussed above, a flowmeter 410 may have a first fluid passage 440A with a different cross-sectional area than a second fluid passage 440B. Likewise, the flowmeter 410 can have a first flowtube 424A with a different cross-sectional shape than a second flowtube 424B. Similarly, flowmeters with more than three or more fluid passages may have two or more different cross-sectional flow areas, and those with three or more flowtubes may have two or more different cross-sectional shapes.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

The subject matter claimed is:

1. A vortex flowmeter comprising:
 a first process connection having a meter inlet therein, the first process connection being configured to connect the meter inlet to an end of an upstream pipe segment of a fluid pipeline;
 a second process connection having a meter outlet therein, the second process connection being configured to connect the meter outlet to an end of a downstream pipe segment of the fluid pipeline;
 a fluid conveyance system for conveying fluid from the meter inlet to the meter outlet, the fluid conveyance system including multiple separate passages configured to divide fluid received by the meter inlet into multiple separate fluid streams and convey the fluid in each stream to the meter outlet;
 a bluff body for each of the separate passages, each bluff body being positioned to generate vortices in the respective fluid stream;
 a sensor for each of the separate fluid passages that is configured to detect vortices in the respective fluid stream; and
 a processing system configured to determine a flow rate through each of the fluid streams using information from the sensors;
 wherein the first and second process connections are configured to connect the flowmeter to a fluid pipeline having a diameter that is at least 10 inches.

2. A vortex flowmeter as set forth in claim 1 wherein the fluid conveyance system is configured to divide the fluid into only two separate streams.

3. A vortex flowmeter as set forth in claim 1 wherein the fluid conveyance system is configured so the flow through each of said multiple fluid streams carries about the same amount of fluid.

4. A vortex flowmeter as set forth in claim 1 wherein the fluid conveyance system is configured so at least one of said multiple fluid streams carries a substantially different amount of fluid than at least one other of said multiple fluid streams.

5. A vortex flowmeter as set forth in claim 1 wherein the processing system is configured to calculate a sum of the flow rate through all of said fluid streams.

6. A vortex flowmeter as set forth in claim 1 wherein the fluid conveyance system is configured so each of the multiple passages has a non-circular cross-sectional flow area.

7. A vortex flowmeter as set forth in claim 6 wherein said non-circular cross-sectional flow areas are each shaped to have a major axis and a minor axis, the major axis being longer than the minor axis.

8. A vortex flowmeter as set forth in claim 7 wherein the bluff bodies are oriented generally perpendicularly to the minor axis.

9. A vortex flowmeter as set forth in claim 6 wherein the fluid conveyance system is configured so there are only two passages and the passages are positioned generally side-by-side and oriented so their major axes are generally parallel.

10. A vortex flowmeter as set forth in claim 6 wherein at least one of the multiple passages has said non-circular cross-sectional flow area along a first segment of said at least one passage and has a circular cross-sectional flow area along a second segment of said at least one passage.

11. A vortex flowmeter as set forth in claim 10 wherein the bluff body for said at least one passage is mounted in said second segment.

12. A vortex flowmeter as set forth in claim 1 wherein at least one of the multiple passages has a first segment of said passage and a second segment of said passage, said first segment having a first end adjacent to said first process connection and a second end connected to the second segment, said first segment having a cross-sectional flow area, said cross-sectional area funneling from said first end to said second end.

13. A vortex flowmeter as set forth in claim 1 wherein each of the passages is configured to constrict fluid as the fluid flows by the respective bluff body.

14. A vortex flowmeter as set forth in claim 1 wherein each of the passages has the same cross-sectional flow area at its respective bluff body.

15. A vortex flowmeter as set forth in claim 1 wherein each of the passages has the same cross-sectional flow area along a meter section length.

16. A system for measuring fluid flow through a fluid pipeline, the system comprising:
 a first vortex metering unit configured to measure flow rate of fluid through the first vortex metering unit;
 a second vortex metering unit configured to measure flow rate of fluid through the second vortex metering unit;
 an upstream process connection mounted on each of the first and second vortex metering units for connecting the first and second vortex metering units to an end of an upstream segment of a fluid pipeline;
 a downstream process connection mounted on each of the first and second vortex metering units for connecting the first and second vortex metering units to an end of a downstream segment of the fluid pipeline;
 wherein the upstream and downstream process connections are configured to connect the system to a fluid pipeline having a diameter that is at least 10 inches.

17. A system as set forth in claim 16 wherein the upstream and downstream process connections are not connected to any fluid pipeline so the system can be transported as a unit.

18. A system as set forth in claim 16 wherein at least one of the first and second vortex metering units has a bluff body positioned in a flowtube having a fluid flow area having a non-circular cross-sectional shape.

19. A system as set forth in claim 16 wherein the first and second vortex metering units each have a flowtube, the flowtubes of the first and second vortex metering units being arranged side-by-side.

20. A system as set forth in claim 16 wherein each of the first and second vortex metering units has a flowtube with a bluff body positioned therein, each of the flowtubes having a cross-sectional flow area at the bluff body, each of the cross-sectional flow areas being equal.

21. A system as set forth in claim 16 wherein each of the first and second vortex metering units has a flowtube with a meter section length, each of the flowtubes having a fixed cross-sectional flow area along its respective meter section length, each of the fixed cross-sectional flow areas being equal.

22. A system as set forth in claim 16 further comprising a processing system configured to calculate a sum of flow rate measurements from the first and second vortex metering units.

23. A system as set forth in claim 16 further comprising a third vortex metering unit, the upstream process connection being mounted on the third vortex metering unit for connecting the third vortex metering unit to the end of the upstream segment of fluid pipeline and the downstream process connection being mounted on the third vortex metering unit for connecting the third vortex metering unit to the end of the downstream segment of the fluid pipeline.

24. A system for measuring fluid flow rate through a fluid pipeline, the system comprising:
- a fluidic system configured to divide flow through the pipeline into multiple passages plumbed in parallel with one another and recombine the flow through the multiple passages into a single stream;
- a bluff body positioned in each of the multiple passages, wherein the bluff body is configured to generate vortices downstream of the bluff body;
- a sensor for each of the multiple passages, each sensor configured to output a signal representative of the vortices generated in one of the multiple passages; and
- a processing system connected to each of the sensors and configured to receive each of said signals and calculate a totalized flow measurement representative of the flow through the fluid pipeline;
- wherein each of the multiple passages is configured to constrict fluid as the fluid flows by the respective bluff body.

25. A system for measuring fluid flow rate through a fluid pipeline, the system comprising:
- an upstream process connection connected to a downstream end of an upstream segment of the fluid pipeline, the upstream process connection having an outer perimeter;
- a downstream process connection connected to an upstream end of a downstream segment of the fluid pipeline;
- multiple fluid passages plumbed in parallel with one another, the passages being arranged so they can be fluidicly connected to the upstream segment of the fluid pipeline by the upstream process connection and fluidicly connected to the downstream segment of the fluid pipeline by the downstream process connection;
- a bluff body positioned in each of the multiple passages, wherein the bluff body is configured to generate vortices downstream of the bluff body;
- a sensor for each of the multiple passages, each sensor configured to output a signal representative of the vortices generated in one of the multiple passages; and
- a processing system connected to each of the sensors and configured to receive each of said signals and calculate a flow rate measurement representative of the flow rate through the fluid pipeline;
- wherein the multiple passages are collectively confined entirely within a geometric space, the geometric space extending between the upstream and downstream process connections and having a cross-sectional area equal to the area circumscribed by the outer perimeter of the upstream process connection; and
- wherein each of the multiple passages is configured to constrict fluid as the fluid flows by the respective bluff body.

* * * * *